United States Patent
Chung et al.

(10) Patent No.: US 8,937,801 B2
(45) Date of Patent: Jan. 20, 2015

(54) ARRAY-TYPE MULTILAYERED CERAMIC ELECTRONIC COMPONENT

(71) Applicant: Samsung Electro-Mechanics Co., Ltd., Suwon, Gyunggi-do (KR)

(72) Inventors: Hae Suk Chung, Gyunggi-do (KR); Byoung Hwa Lee, Gyunggi-do (KR); Min Cheol Park, Gyunggi-do (KR); Eun Hyuk Chae, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 243 days.

(21) Appl. No.: 13/678,106

(22) Filed: Nov. 15, 2012

(65) Prior Publication Data

US 2013/0201603 A1 Aug. 8, 2013

(30) Foreign Application Priority Data

Feb. 7, 2012 (KR) ........................ 10-2012-0012273

(51) Int. Cl.
*H01G 4/30* (2006.01)
*H01G 4/06* (2006.01)
*H01G 4/232* (2006.01)
*H01G 4/012* (2006.01)

(52) U.S. Cl.
CPC .............. *H01G 4/012* (2013.01); *H01G 4/232* (2013.01); *H01G 4/30* (2013.01)
USPC ........................ 361/329; 361/301.4; 361/311

(58) Field of Classification Search
USPC ............ 361/306.3, 311, 301.4, 303, 328–329
See application file for complete search history.

(56) References Cited

U.S. PATENT DOCUMENTS

| 7,224,569 B2 * | 5/2007 | Togashi et al. ................. 361/303 |
| 7,291,235 B2 * | 11/2007 | Prymak ...................... 156/89.12 |
| 7,436,648 B2 * | 10/2008 | Togashi ........................ 361/303 |
| 7,974,072 B2 * | 7/2011 | Lee et al. ...................... 361/303 |
| 2007/0211405 A1 | 9/2007 | Togashi |

FOREIGN PATENT DOCUMENTS

| JP | 64046912 a | * | 2/1989 |
| JP | 06283383 A | * | 10/1994 |
| JP | 11154621 A | * | 6/1999 |
| KR | 10-2005-0089493 A | | 9/2005 |
| KR | 10-2007-0092150 A | | 9/2007 |

* cited by examiner

*Primary Examiner* — Eric Thomas
(74) *Attorney, Agent, or Firm* — McDermott Will & Emery LLP (57) ABSTRACT

There is provided an array-type multilayered ceramic electronic component including: a ceramic body; a plurality of external electrodes formed on one surface of the ceramic body and the other surface thereof opposing the one surface; and a plurality of internal electrode multilayered parts formed in the ceramic body and connected to the external electrodes, respectively, wherein when a gap between the internal electrode multilayered parts is G and internal electrode density is D, $40\% \leq D \leq 57\%$, $10\ \mu m \leq G \leq 200\ \mu m$, and $G \geq (0.0577 \times D^2) - (4.4668 \times D) + 111.22$. Therefore, delamination and cracking may be prevented.

25 Claims, 5 Drawing Sheets

ARRAY-TYPE MULTILAYERED CERAMIC ELECTRONIC COMPONENT

CROSS-REFERENCE TO RELATED APPLICATIONS

This application claims the priority of Korean Patent Application No. 10-2012-0012273 filed on Feb. 7, 2012, in the Korean Intellectual Property Office, the disclosure of which is incorporated herein by reference.

BACKGROUND OF THE INVENTION

1. Field of the Invention

The present invention relates to an array-type multilayered ceramic electronic component.

2. Description of the Related Art

In accordance with the recent trend for the miniaturization and multi-functionalization of electronic products, electronic components for use therein have also been miniaturized, multi-functionalized, and increased in capacitance. Therefore, demand for multilayered electronic components satisfying these requirements has increased.

Examples of multilayered electronic components include chip capacitors, chip beads, chip inductors, chip varistors, and the like. Among them, an array-type chip capacitor may be formed by integrating a plurality of chip capacitors as a single component. An inner part of the array-type chip capacitor is formed to have two or more independent internal electrode patterns implementing capacitance therein, and in accordance with the trend for the miniaturization of electronic components and increases in the capacitance thereof, as compared with the related art, the number of internal electrode layers has been further increased, while intervals between the internal electrodes has been reduced.

Therefore, a difference in density between an internal electrode multilayered part and a part other than the internal electrode multilayered part in which internal electrodes are multilayered may be further increased, such that delamination and a cracking may be generated and electrical characteristics and reliability may also be deteriorated.

SUMMARY OF INVENTION

An aspect of the present invention provides an array-type multilayered ceramic electronic component capable of suppressing generation of delaminations and cracking.

According to an aspect of the present invention, there is provided an array-type multilayered ceramic electronic component including: a ceramic body; a plurality of external electrodes formed on one surface of the ceramic body and the other surface thereof opposing the one surface; and a plurality of internal electrode multilayered parts formed in the ceramic body and connected to the external electrodes, respectively, wherein when a gap between the internal electrode multilayered parts is G and a density of the internal electrode is D, the conditions of $40\% \leq D \leq 57\%$, $10~\mu m \leq G \leq 200\mu m$, and $G \geq (0.0577 \times D^2) - (4.4668 \times D) + 111.22$ may be met.

The number of internal electrode multilayered parts may be two.

Each of the plurality of external electrodes formed on the one surface of the ceramic body may be disposed to oppose the plurality of external electrodes formed on the other surface of the ceramic body.

The external electrode may cover an exposed part of the internal electrode.

The external electrode may be extended in a direction in which the internal electrodes are multilayered.

The external electrodes may be extended to portions of upper and lower surfaces of the ceramic body.

The internal electrode multilayered part may be formed by disposing the internal electrodes to have a ceramic layer interposed therebetween and to be overlapped with each other.

The plurality of internal electrode multilayered parts may be connected to the plurality of external electrodes opposing each other, respectively.

Each of adjacent internal electrodes in the internal electrode multilayered part may be exposed in opposing directions to thereby be connected to the external electrodes opposing each other.

The gap G between the internal electrode multilayered parts may be an average gap between positions of end portions of the plurality of multilayered internal electrodes.

In the case in which the number of internal electrode multilayered parts is three or more, the gap G between the internal electrode multilayered parts may be a minimum value among a plurality of gaps in any one layer.

The internal electrode may include a capacitance part contributing to capacitance formation and an exposed part connecting the capacitance part to the external electrode, wherein the capacitance part and the exposed part may be rectangular.

The ceramic body may be a 0906-sized or smaller.

When a gap from a surface of the ceramic body to the internal electrode multilayered part is M, the conditions of $G \leq M$ and $M \leq 200~\mu m$ may be met.

According to another aspect of the present invention, there is provided an array-type multilayered ceramic electronic component including: a ceramic body; a plurality of first and second external electrodes formed on one surface of the ceramic body and the other surface thereof opposing the one surface; a plurality of first internal electrodes connected to the plurality of first external electrodes formed on the one surface of the ceramic body, respectively, and planarly formed on a common layer; and a plurality of second internal electrodes each disposed to have a ceramic layer interposed between the plurality of first internal electrodes and the plurality of second internal electrodes to thereby be planarly formed on a common layer, connected to the plurality of second external electrodes formed on the other surface, and overlapped with the plurality of first internal electrodes, wherein when a gap between the plurality of internal electrodes on the common layer is G, a density of the internal electrode is D, and a gap from a surface of the ceramic body to the first and second internal electrodes is M, the conditions of $40\% \leq D \leq 57\%$, $10~\mu m \leq G \leq M$, and $G \leq (0.0577 \times D^2) - (4.4668 \times D) + 111.22$ may be met.

$M \leq 200~\mu m$.

Each of the first and second internal electrodes may include a capacitance part and an exposed part, wherein the exposed part is smaller than the capacitance part.

The capacitance part may be rectangular.

The gap between the plurality of internal electrodes on the common layer may be a gap between the capacitance parts.

The number of each of the first and second internal electrodes may be two.

The external electrode may cover exposed parts of the first and second internal electrodes.

The external electrode may be extended in a direction in which the first and second internal electrodes are multilayered.

The external electrode may be extended to portions of upper and lower surfaces of the ceramic body.

The ceramic body may be a 0906-sized or smaller.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Embodiments of the present invention will now be described in detail with reference to the accompanying drawings.

The embodiments of the present invention may be modified in many different forms and the scope of the invention should not be construed as being limited to the embodiments set forth herein.

Rather, these embodiments are provided so that this disclosure will be thorough and complete, and will fully convey the concept of the invention to those skilled in the art.

In the drawings, the shapes and dimensions may be exaggerated for clarity, and the same reference numerals will be used throughout to designate the same or like components.

Figure 1:
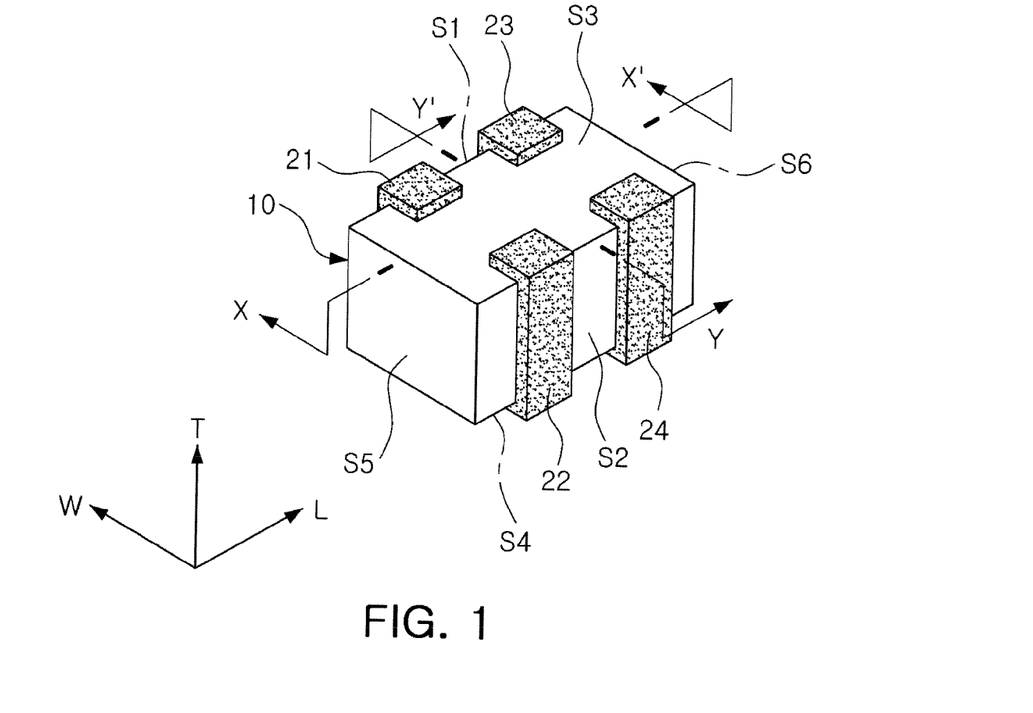
FIG. 1 is a perspective view showing an appearance of an array-type multilayered ceramic electronic component according to an embodiment of the present invention.
Figure 2:
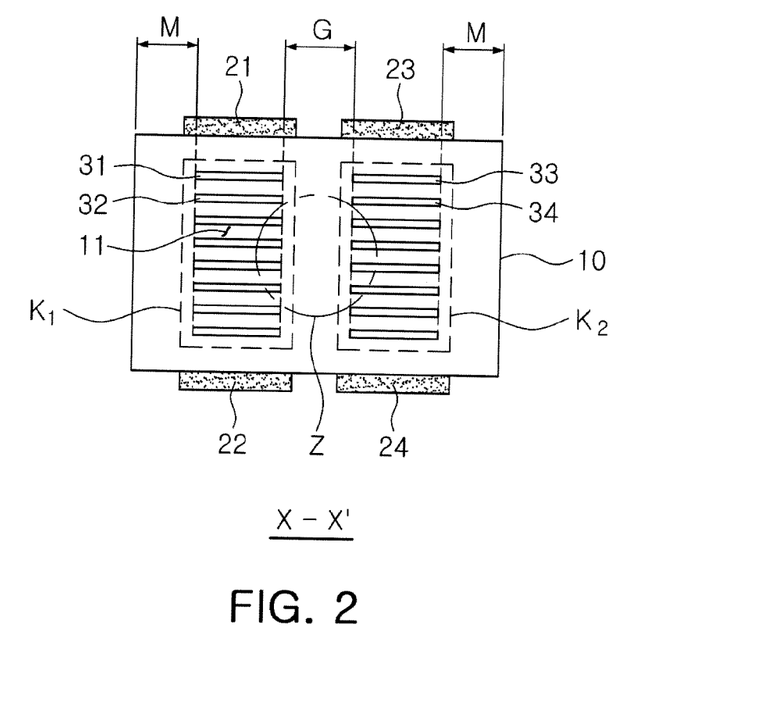
FIG. 2 is a cross-sectional view taken along line X-X' of FIG. 1.
Figure 3:
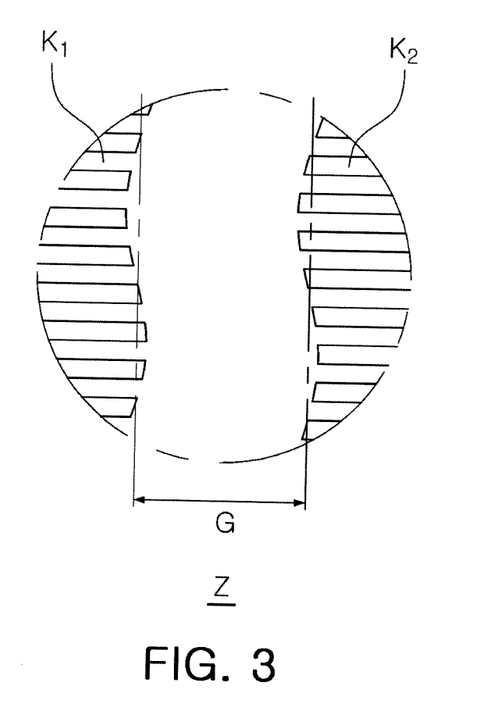
FIG. 3 is an enlarged view of part Z of FIG. 2.
Figure 4:
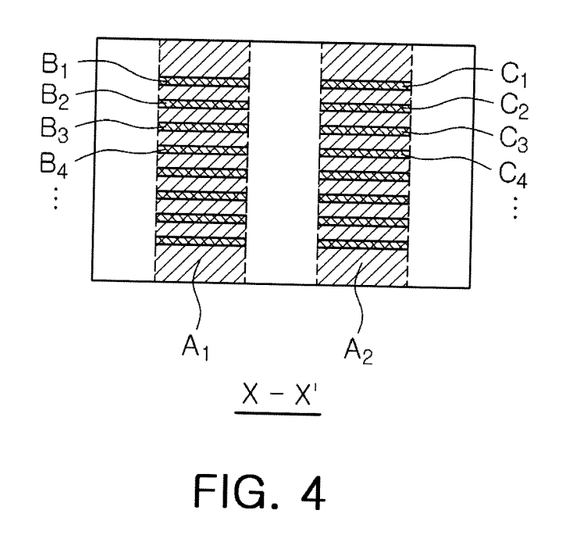
FIG. 4 is a cross-sectional view taken along with line X-X' of FIG. 1 and describing internal electrode density.
Figure 5:
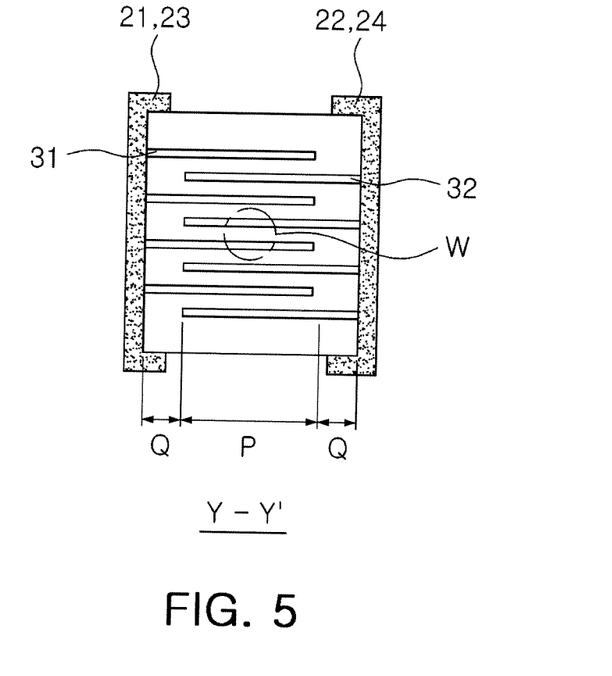
FIG. 5 is a cross-sectional view taken along line Y-Y' of FIG. 1.
Figure 6A:
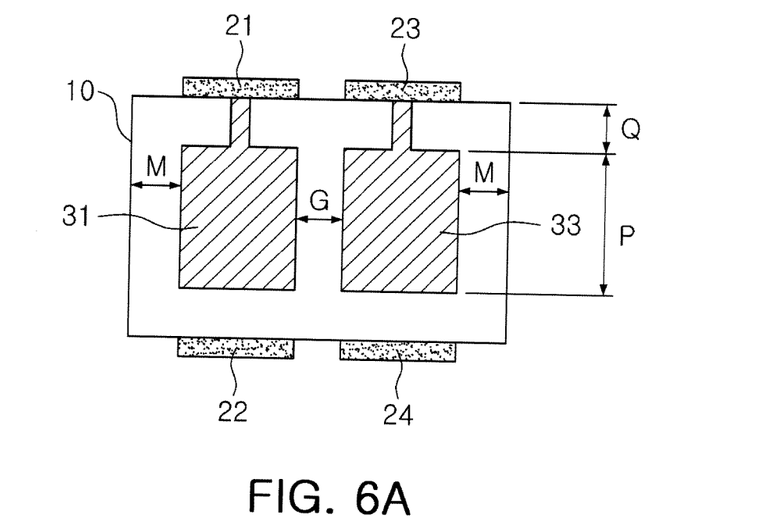
FIGS. 6A and 6B are plan views showing a shape of an internal electrode of the array-type multilayered ceramic electronic component according to the embodiment of the present invention.
Figure 6B:
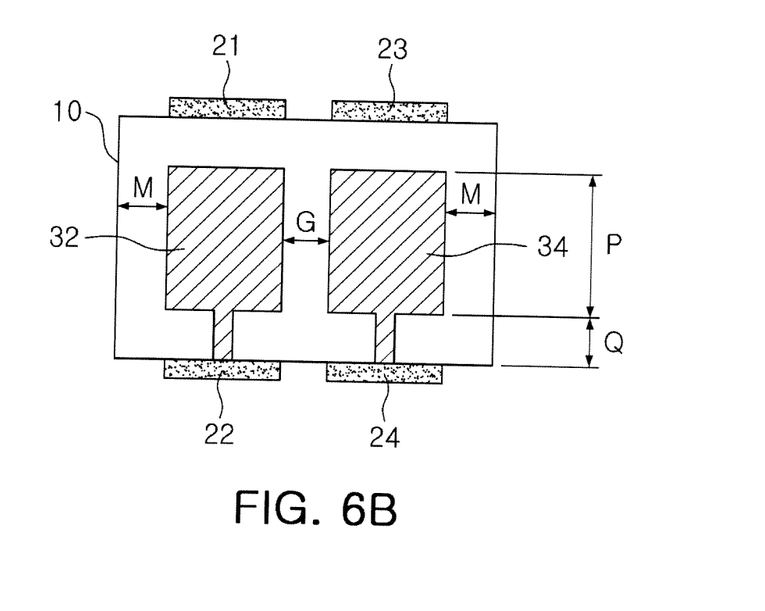
Figure 7:
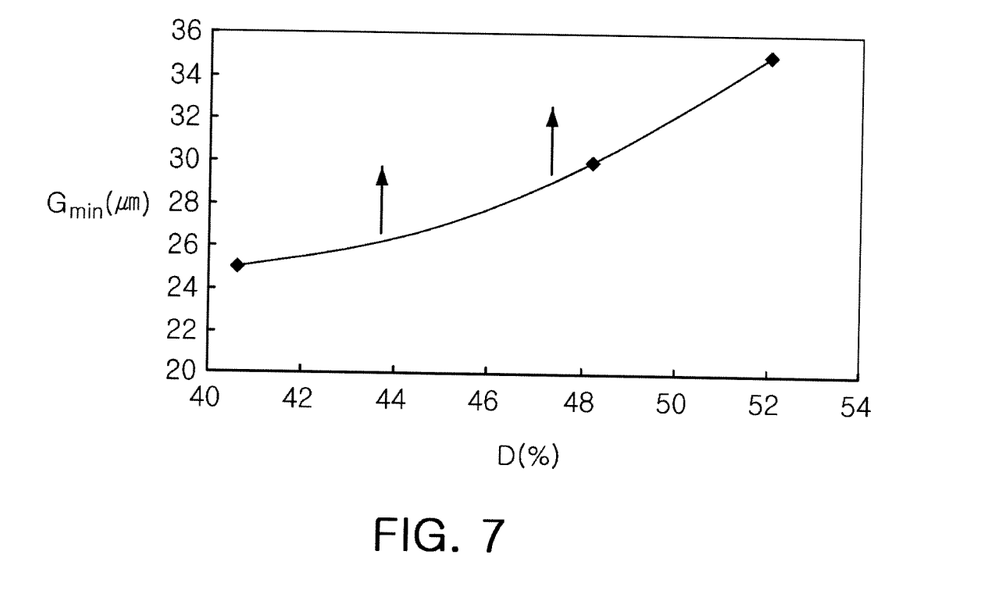
FIG. 7 is a graph showing a relationship between a gap G between internal electrode multilayered parts and internal electrode density D in the array-type multilayered ceramic electronic component according to the embodiment of the present invention.
Figure 8:
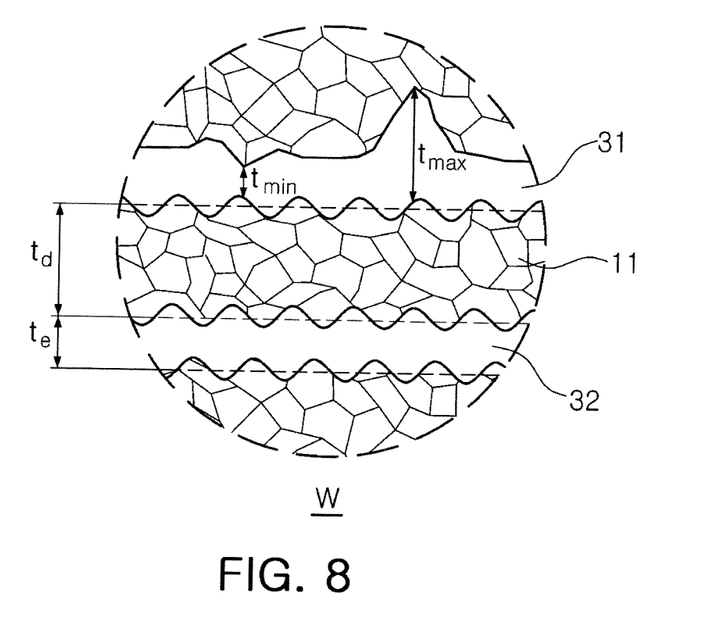
FIG. 8 is an enlarged view of part W of FIG. 5.

FIG. 1 is a perspective view showing an appearance of an array-type multilayered ceramic electronic component according to an embodiment of the present invention. FIG. 2 is a cross-sectional view taken along line X-X' of FIG. 1. FIG. 3 is an enlarged view of the part Z of FIG. 2. FIG. 4 is a cross-sectional view taken along with line X-X' of FIG. 1 describing internal electrode density. FIG. 5 is a cross-sectional view taken along line Y-Y' of FIG. 1. FIGS. 6A and 6B are plan views showing a shape of an internal electrode of the array-type multilayered ceramic electronic component according to the embodiment of the present invention. FIG. 7 is a graph showing a relationship between a gap G between internal electrode multilayered parts and internal electrode density D in the array-type multilayered ceramic electronic component according to the embodiment of the present invention. FIG. 8 is an enlarged view of the part W of FIG. 5.

Referring to FIG. 1, an array-type multilayered ceramic electronic component according to an embodiment of the present invention may include a ceramic body 10; a plurality of external electrodes 21 to 24 formed on one surface S1 of the ceramic body 10 and the other surface S2 thereof opposing the one surface S1; and a plurality of internal electrode multilayered parts $K_1$ and $K_2$ formed in the ceramic body 10.

The ceramic body 10 refers to a body formed of a ceramic material and may have a rectangular parallelepiped shape. An "L direction" refers to a "length direction", a "W direction" refers to a "width direction", and a "T direction" refers to a "thickness direction".

The ceramic material may be a dielectric material having high permittivity. More specifically, the ceramic material may be barium titanate or strontium titanate. Electric dipoles may be microscopically present in the dielectric material. In the case in which the dielectric material is present between electrodes having opposing polarities, the electric dipole in the dielectric material may be aligned in response to an electric field formed between the electrodes. Therefore, more charge may be accumulated in each of two electrodes having opposing polarities.

The external electrodes 21 to 24 may be formed on one surface S1 of the ceramic body 10 and the other surface S2 thereof opposing the one surface S1.

The external electrodes 21 and 23 formed on one surface S1 of the ceramic body 10 may be referred to as first external electrodes, more specifically, a 1-$1^{st}$ external electrode 21 and a 1-$2^{nd}$ external electrode 23 sequentially in the length direction. The external electrodes 22 and 24 formed on the other surface S2 of the ceramic body 10 may be referred to as second external electrodes, more specifically, a 2-$1^{st}$ external electrode 22 and a 2-$2^{nd}$ external electrode 24 sequentially in the length direction.

Although FIG. 1 shows the case in which the number of each of the first and second external electrodes is two, the present invention is not limited thereto. That is, the number of first and second external electrodes may be three or more.

The plurality of external electrodes 21 and 23 formed on one surface S1 of the ceramic body 10 may be disposed to respectively oppose the plurality of external electrodes 22 and 24 formed on the other surface S2 of the ceramic body 10. That is, the 1-$1^{st}$ external electrode 21 and the 2-$1^{st}$ external electrode 22 may be disposed to oppose each other, and the 1-$2^{nd}$ external electrode 23 and the 2-$2^{nd}$ external electrode 24 may be disposed to oppose each other.

The external electrodes 21 to 24 may be extended in the thickness direction (the "T direction") and cover an exposed part (not shown) of the internal electrode exposed to a surface of the ceramic body 10.

The exposed parts of the internal electrodes exposed from the internal electrode multilayered parts $K_1$ and $K_2$ to the surface of the ceramic body 10 may be arranged in the thickness direction (the "T direction"). The external electrodes 21 to 24 may be formed in the thickness direction (the "T direction") so as to cover the exposed parts of the internal electrodes. Therefore, penetration of external foreign objects, a plating solution, or the like, into the ceramic body 10 may be prevented, whereby product lifespan and reliability may be improved.

In addition, the external electrodes 21 to 24 may be extended to portions of upper and lower surfaces S3 and S4 of the ceramic body 10. A contact portion between the external electrodes 21 to 24 and the ceramic body 10 may have an angular shape. Since the angular shape has a relatively larger capability to endure external force in view of a geometrical structure, adhesion of the external electrodes 21 to 24 to the ceramic body 10 may be further improved.

The internal electrode multilayered parts $K_1$ and $K_2$ indicate a region in which the internal electrodes 31 and 32 are alternately multilayered in the ceramic body 10, having a ceramic layer 11 therebetween. The number of internal electrode multilayered parts $K_1$ and $K_2$ may be two, which may be referred to as first and second internal electrode multilayered parts $K_1$ and $K_2$, respectively. However, the number of internal electrode multilayered parts $K_1$ and $K_2$ is not limited thereto, but may be three or more.

FIG. 2 is a cross-sectional view taken along line X-X' of FIG. 1. Referring to FIG. 2, the internal electrodes 31 and 32 may be overlapped with each other when projected in the thickness direction.

A region in which adjacent internal electrodes are overlapped with each other may contribute to capacitance formation and be referred to as a capacitance part P. A region in which the adjacent internal electrodes are not overlapped with each other does not contribute to capacitance formation, but may serve to expose the capacitance part to the surface of the ceramic body and be referred to as an exposed part Q.

Each of the capacitance part P and the exposed part Q may be rectangular. The exposed part may have a width smaller than that of the capacitance part. A gap between internal electrode multilayered parts to be described below may be a gap between the capacitance parts.

FIG. 3 is an enlarged view of part Z of FIG. 2. Referring to FIG. 3, the gap G between the internal electrode multilayered parts $K_1$ and $K_2$ may be a gap between average positions of end portions of a plurality of multilayered internal electrodes.

Although FIGS. 1 through 6 show the case in which the number of internal electrode multilayered parts $K_1$ and $K_2$ is two, the present invention is not limited thereto. That is, the number of internal electrode multilayered parts may be three or more. In this case, the gap G between the internal electrode multilayered parts may be a minimum value among a plurality of gaps in any one layer.

FIG. 4 is a cross-sectional view taken along with line X-X' of FIG. 1 and describing internal electrode density D.

Referring to FIG. 4, the internal electrode density D indicates a ratio of the internal electrodes with regard to the ceramic body. More specifically, the internal electrode density D may be defined as a ratio of the sum (B1+B2+B3+ . . . +C1+C2+C3) of cross sections of the internal electrodes to the sum (A1+A2) of areas (A1 and A2) of regions of the internal electrode multilayered parts $K_1$ and $K_2$ extended in the thickness direction.

In other words, the internal electrode density D is a ratio of an area (B1+B2+B3+ . . . +C1+C2+C3) of a double oblique line region to an area (A1+A2) of an oblique line region.

The area of the oblique line region may be measured as follows. The area of the oblique line region may be calculated by capturing a photograph so as to include the internal electrode multilayered parts in a polished cross section, defining a reference line indicating an average position of end portions of the internal electrodes that is not constant in the thickness direction, and calculating an area of a region enclosed by both reference lines of the internal electrode multilayered parts and the surface of the ceramic body.

The area of the double oblique line region, that is, the sum of cross-sectional areas of the internal electrodes may be calculated by multiplying an average thickness of the internal electrodes by the number of layers of the internal electrodes. Measurement of the average thickness of the internal electrodes will be described in detail with reference to FIG. 8 in an Experimental Example.

The internal electrode density D may be an index of miniaturization and an increase in capacitance. In accordance with the miniaturization and the increase in capacitance, thicknesses of cover regions over and under the internal electrode multilayered parts may decrease, and the internal electrodes may become thinner, such that the internal electrode density may further increase.

The meaning that the internal electrode density D is large is that the percentage of the ceramic body that the internal electrodes occupy is large. Since the internal electrode has a thermal expansion coefficient larger than that of the ceramic body, the internal electrode is larger in terms of a degree of expansion and contraction than the ceramic body during a process in which it is subjected to heating history. Therefore, delamination may be generated between the internal electrode and the ceramic body, which may further lead to generation of cracking.

When the internal electrode density is D and the gap between the internal electrode multilayered parts $K_1$ and $K_2$ is G, 40%≤D≤57%, 10 μm≤G≤200 μm, and G≥(0.0577×$D^2$)−(4.4668×D)+111.22.

When D is smaller than 40%, delaminations and cracking may not be generated regardless of G.

When D is larger than 57%, delaminations and cracking may be generated regardless of a value of G. That is, when D is larger than 57% due to excessive thinning and an excessive increase in capacitance, even in a case in which G is adjusted, the generation of delaminations and cracking may not be suppressed.

In the case in which 40%≤D≤57%, delaminations and cracking may be generated due to the thinning of the multilayered ceramic capacitor and the increase in capacitance thereof. In this case, G is appropriately adjusted, whereby the generation of delaminations and cracking may be prevented. That is, a value G may be within the above-mentioned range. In the case in which D is in a range of 40 to 57%, G is increased, whereby the generation of delaminations and cracking may be suppressed.

However, G may have a value in a range of 10 to 200 μm. When G is smaller than 10 μm, since the internal electrode multilayered parts may be electrically connected to each other, the internal electrode multilayered parts may be formed to be separated from each other, such that an effect to be accomplished may be obtained. When G is larger than 200 μm, an area of the internal electrode may decrease, such that it may be difficult to implement capacitance.

In addition, a minimum value of G in the range of 10 to 200 μm may be represented by a function of D. More specifically, the G value may be (0.0577×$D^2$)−(4.4668×D)+111.22 or more. The above Equation has been derived with reference to Table 1 and has been shown as a graph in FIG. 5.

Referring to Table 1, in the case in which the internal electrode density D is 40.60 (sample 9), the gap G between the internal electrode multilayered parts needs to be larger than 25 μm in order to avoid delaminations and cracking. That is, when D is 40.6%, a minimum value of G is 25 μm.

In the case in which the internal electrode density D is 48.2% (sample 12), the gap between the internal electrode multilayered parts needs to be larger than 30 μm in order to allow delamination and cracking to be avoided. That is, when D is 48.2%, a minimum value of G is 30 μm.

In the case in which the internal electrode density D is 52% (sample 15), the gap between the internal electrode multilayered parts needs to be larger than 35 μm in order to allow delamination and cracking to be avoided. That is, when D is 52%, a minimum value of G is 35 μm.

The above Equation has been derived by an extrapolation method based on the above-mentioned three points.

FIG. 5 is a cross-sectional view taken along line Y-Y' of FIG. 1. Referring to FIG. 5, each of the internal electrodes 31 and 32 adjacent to each other in the thickness direction in the internal electrode multilayered parts $K_1$ and $K_2$ may be exposed in opposing directions to thereby be connected to the external electrodes 21 and 22 opposing each other, respectively. That is, when anyone internal electrode 31 is connected to the first external electrodes 21 and 23, the internal electrode 32 adjacent to the internal electrode 31 in the thickness direction may be connected to the second external electrodes 22 and 24.

Although the case in which the number of internal electrode multilayered parts K is two ($K_1$ and $K_2$) has been mainly described above, the present invention is not limited thereto.

A chip may be a 0906-sized or smaller.

In accordance with miniaturization of an array component, the gap G between the internal electrode multilayered parts $K_1$ and $K_2$ may become gradually narrow, such that a step between the internal electrode multilayered parts and a ceramic region enclosing the internal electrode multilayered parts may be further deepened. Stress may always be present in a portion in which the step is present. In addition, the stress present in an inner portion may further increase due to the deepening of the step.

This step may be significant when the chip is the 0906-sized or smaller, such that delaminations and cracking may be generated.

A 0906-sized chip is a chip in which each of a length and a width of a chip is 0.9 mm±0.1 mm and 0.6 mm±0.1 mm.

Referring to FIGS. 2, 6A and 6B, when a gap (hereinafter, referred to as a "margin") from surfaces S5 and S6 of the ceramic body 10 to the internal electrode multilayered parts $K_1$ and $K_2$ is M, G≤M. That is, the margin M may be equal to or larger than the gap G between the internal electrode multilayered parts.

In accordance with miniaturization of an array product, the gap G between the internal electrode multilayered parts $K_1$ and $K_2$ may become small and in the case in which the margin M is smaller than the gap G between the internal electrode multilayered parts, a defect may be generated at the time of cutting a multilayered sheet.

In addition, the margin M may be 200 µm or less.

When the margin M is larger than 200 µm, an area of the internal electrode may decrease, such that it is difficult to implement design capacitance.

INVENTIVE EXAMPLE

Hereinafter, the present invention will be described in detail with reference to Inventive Example and Comparative Example.

Barium titanate powder, ceramic powder, ethanol, an organic solvent, and polyvinyl butyral, a binder, were mixed with each other and then ball-milled using a zirconia ball to produce a ceramic slurry. A ceramic green sheet was manufactured using the ceramic slurry by a doctor blade method, and internal electrodes were formed on the ceramic green sheet through screen printing. As a material of the internal electrode, a conductive paste containing nickel was used.

100 or more ceramic green sheets were multilayered and then cut and sintered to manufacture a sintered chip, and external electrodes were formed to oppose each other in pairs.

After the ceramic green sheets were sintered, whether or not delaminations and cracking were generated was observed according to an average thickness $T_e$ of the internal electrodes, a thickness $T_d$ of a ceramic layer interposed between the internal electrodes, internal electrode density ID, and a gap G between the internal electrode multilayered parts, and observation results were shown in Table 1.

Measurement of the average thicknesses $t_d$ and $t_e$ of the ceramic layer and the internal electrode will be described with reference to FIG. 8, an enlarged view of part W of FIG. 5.

Referring to FIG. 8, the average thickness $t_e$ of the internal electrode may be measured by measuring a thickness of any internal electrode extracted from an image obtained by scanning a cross section in a length and thickness (L-T) direction cut at a central portion of the ceramic body 10 in a width (W) direction using a scanning electron microscope (SEM) at thirty points, each having an equidistance therebetween in a length direction. The thirty points each having the equidistance therebetween may be measured in a capacitance part, indicating a region in which the internal electrodes are overlapped with each other. When an average thickness of ten or more internal electrodes is measured, the average thickness of the internal electrode may be further generalized.

The average thickness $t_d$ of the ceramic layer may be measured by the same method as the method of measuring the average thickness $t_e$ of the internal electrode.

TABLE 1

| Sample | $T_d$ (µm) | $T_e$ (µm) | The Number of Layers | D (%) | G (µm) | $G_{min}$ (µm) | Delamination Generation Rate (%) | Crack Generation Rate (%) |
|---|---|---|---|---|---|---|---|---|
| 1 | 2.0 | 1.0 | 134 | 29.1 | 10 | 30.1 | 0 | 0 |
| 2 | 2.0 | 1.0 | 134 | 29.1 | 20 | 30.1 | 0 | 0 |
| 3 | 2.0 | 1.0 | 134 | 29.1 | 30 | 30.1 | 0 | 0 |
| 4 | 2.0 | 1.0 | 134 | 29.1 | 50 | 30.1 | 0 | 0 |
| 5 | 1.5 | 1.0 | 160 | 34.9 | 20 | 25.6 | 0 | 0 |
| 6 | 1.5 | 1.0 | 160 | 34.9 | 30 | 25.6 | 0 | 0 |
| 7 | 1.5 | 1.0 | 160 | 34.9 | 50 | 25.6 | 0 | 0 |
| 8 | 0.8 | 0.7 | 265 | 40.6 | 20 | 22.0 | 2.7 | 1.7 |
| 9 | 0.8 | 0.7 | 265 | 40.6 | 25 | 25.0 | 0 | 0 |
| 10 | 0.8 | 0.7 | 265 | 40.6 | 30 | 25.0 | 0 | 0 |
| 11 | 0.4 | 0.5 | 445 | 48.2 | 25 | 30.0 | 1.2 | 1.0 |
| 12 | 0.4 | 0.5 | 445 | 48.2 | 30 | 30.0 | 0 | 0 |
| 13 | 0.4 | 0.5 | 445 | 48.2 | 35 | 30.0 | 0 | 0 |
| 14 | 0.2 | 0.3 | 800 | 52.0 | 30 | 35.0 | 0.9 | 0.7 |
| 15 | 0.2 | 0.3 | 800 | 52.0 | 35 | 35.0 | 0 | 0 |
| 16 | 0.2 | 0.3 | 800 | 52.0 | 40 | 35.0 | 0 | 0 |
| 17 | 0.1 | 0.2 | 1330 | 57.8 | 60 | 45.8 | 4.6 | 3.5 |
| 18 | 0.1 | 0.2 | 1330 | 57.8 | 70 | 45.8 | 4.3 | 3.2 |
| 19 | 0.1 | 0.2 | 1330 | 57.8 | 80 | 45.8 | 4.2 | 3.1 |

In Table 1, $G_{min}$ indicates a minimum value of G, which is a value obtained by performing a calculation according to $(0.0577 \times D^2) - (4.4668 \times D) + 111.2$ and rounding off the result to two decimal places. D was replaced by a value converted into %.

Referring to Table 1, in Samples 1 to 7 corresponding to the cases in which $T_d$ is 2.0 or 1.5 μm, $T_e$ is 1.0 μm, D is 29.1 or 34.9%, and G is 10, 20, 30, or 50 μm, delaminations or cracking were not generated.

Samples 1 to 7 correspond to a low capacitance capacitor in which the thickness $T_d$ of the dielectric layer and the thickness $T_e$ of the internal electrode are relatively thick and the internal electrode density D is smaller than 40%. In the case of this low capacitance capacitor, even in a case in which the gap G between the internal electrode multilayered parts was changed by 10 to 50 μm, delaminations and cracking were not generated regardless a G value.

In the case of the low capacitance capacitor, the internal electrode density D is small, such that the gap G between the internal electrodes is not problematic.

In Sample 8, corresponding to the case in which $T_d$ is 0.8 μm, $T_e$ is 0.7 μm, D is 40.6%, G is 20 μm, and $G_{min}$ is 22 μm, the delaminations (2.7%) and cracking (1.7%) were generated. This case corresponds to the case in which a G value is smaller than a $G_{min}$ value.

In Samples 9 and 10 corresponding to the case in which $T_d$ is 0.8 μm, $T_e$ is 0.7 μm, D is 40.6%, G is 25 μm and 30 μm, and $G_{min}$ is 25 μm and 30 μm, delaminations and cracking were not generated. This case corresponds to the case in which the G value is equal to or larger than the $G_{min}$ value.

Referring to Samples 8 to 10, it could be appreciated that the thickness $T_d$ of the dielectric layer and the thickness of the internal electrode decrease and the internal electrode density D exceeds 40%, so delaminations and cracking were generated. In this case, when the gap G between the internal electrode multilayered parts increases from 20 μm to 25 μm or 30 μm, delaminations and cracking were not generated. That is, it could be appreciated that the G value is allowed to be equal to or larger than the $G_{min}$ value, whereby the generation of delaminations and cracking may be prevented.

In Sample 11 corresponding to the case in which $T_d$ is 0.4 μm, $T_e$ is 0.5 μm, D is 48.2%, G is 25 μm, and $G_{min}$ is 30 μm, delaminations (1.2%) and cracking (1.0%) were generated. This case corresponds to the case in which a G value is smaller than a $G_{min}$ value.

In Samples 12 and 13 corresponding to the case in which $T_d$ is 0.4 μm, $T_e$ is 0.5 μm, D is 48.2%, G is 30 μm and 35 μm, and $G_{min}$ is 30 μm, delaminations and cracking were not generated. This case corresponds to the case in which the G value is equal to or larger than the $G_{min}$ value.

Referring to Samples 11 to 13, as the thickness $T_d$ of the dielectric layer and the thickness $T_e$ of the internal electrode further decrease and the internal electrode density D further increases (48.2%), delamination and cracking were generated. However, when G increases from 25 μm to 30 μm or 35 μm, delamination and cracking were not generated. That is, it could be appreciated that the G value is allowed to be equal to or larger than the $G_{min}$ value, whereby the generation of delamination and cracking may be prevented.

In other words, as an increase in capacitance further progresses, delaminations and cracking may be generated. However, even in this case, the gap G between the internal electrodes is adjusted, whereby the generation of delaminations and cracking may be suppressed.

In Sample 14 corresponding to the case in which $T_d$ is 0.2 μm, $T_e$ is 0.3 μm, D is 52.0%, G is 30 μm, and $G_{min}$ is 35 μm, delaminations (0.9%) and cracking (0.7%) were generated. This case corresponds to the case in which a G value is smaller than a $G_{min}$ value.

In Samples 15 and 16 corresponding to the case in which $T_d$ is 0.2 μm, $T_e$ is 0.3 μm, D is 52.0%, G is 35 μm and 40 μm, and $G_{min}$ is 35 μm and 35 μm, delaminations and cracking were not generated. This case corresponds to the case in which the G value is equal to or larger than the $G_{min}$ value.

Referring to Samples 14 to 16, as the thickness $T_d$ of the dielectric layer and the thickness of the internal electrode further decreased and the internal electrode density D further increased (52%), delaminations and cracking were generated. However, when G increases from 30 μm to 35 μm or 40 μm, delaminations and cracking were not generated. That is, it could be appreciated that the G value is allowed to be equal to or larger than the $G_{min}$ value, whereby the generation of delaminations and cracking may be prevented.

Referring the above-mentioned result for Samples 8 to 16, it could be appreciated that as capacitance increases (the thickness $T_d$ of the dielectric layer and the thickness $T_e$ of the internal electrode decrease and the internal electrode density D increases), delaminations and cracking may be generated; however, even in this case, the gap G between the internal electrode multilayered parts may be adjusted to be larger than $G_{min}$, whereby the generation of delaminations and cracking may be prevented.

In Samples 17 to 19 corresponding to the case in which $T_d$ is 0.1 μm, $T_e$ is 0.2 μm, D is 57.8%, G is 60 μm, 70 μm, and 80 μm, and $G_{min}$ is 45.8 μm, 45.8 μm and 45.8 μm, delaminations and cracking were generated. It could be appreciated that even in a case in which G increases from 60 μm to 70 μm and 80 μm, delaminations and cracking were still generated.

It could be appreciated that in the case of an ultra-high capacitance capacitor in which the thickness $T_d$ of the dielectric layer and the thickness $T_e$ of the internal electrode excessively decrease and the internal electrode density D is excessively large (57% or more), even when the gap G between the internal electrodes increases, the generation of delaminations and cracking may not be suppressed.

In conclusion, the following facts may be confirmed.

First, in the array type multilayered ceramic capacitor, in the case of a low capacitance capacitor in which the thickness $T_d$ of the dielectric layer and the thickness $T_e$ of the internal electrode are relatively thick and the internal electrode density D is 40% or less, delaminations and cracking were not generated regardless of a size of the gap G between the internal electrode multilayered parts.

Second, even in a case in which the capacitance increases due to the decrease in the thicknesses of the dielectric layer and the internal electrode and the increase in the internal electrode density D, the gap G between the internal electrodes may be adjusted, whereby the generation of delaminations and cracking may be prevented.

Third, however, it could be appreciated that in a case in which the internal electrode density D exceeds 57%, even when the gap G between the internal electrodes is adjusted, the generation of delaminations and cracking may not be prevented.

As set forth above, with the array-type multilayered ceramic electronic component according to the embodiments of the present invention, the generation of delaminations and cracking may be suppressed.

While the present invention has been shown and described in connection with the embodiments, it will be apparent to those skilled in the art that modifications and variations can be made without departing from the spirit and scope of the invention as defined by the appended claims.

What is claimed is:

1. An array-type multilayered ceramic electronic component comprising:
    a ceramic body;
    a plurality of external electrodes formed on one surface of the ceramic body and the other surface thereof opposing the one surface; and
    a plurality of internal electrode multilayered parts formed in the ceramic body and connected to the external electrodes, respectively,
    when a gap between the internal electrode multilayered parts is G and a density of the internal electrode is D, the conditions of $40\% \leq D \leq 57\%$, $10\mu m \leq G \leq 200\mu m$, and $G \geq (0.0577 \times D^2) - (4.4668 \times D) + 111.22$ being met.

2. The array-type multilayered ceramic electronic component of claim 1, wherein the number of internal electrode multilayered parts is two.

3. The array-type multilayered ceramic electronic component of claim 1, wherein each of the plurality of external electrodes formed on the one surface of the ceramic body is disposed to oppose the plurality of external electrodes formed on the other surface of the ceramic body.

4. The array-type multilayered ceramic electronic component of claim 1, wherein the external electrode covers an exposed part of the internal electrode.

5. The array-type multilayered ceramic electronic component of claim 1, wherein the external electrode is extended in a direction in which the internal electrodes are multilayered.

6. The array-type multilayered ceramic electronic component of claim 1, wherein the external electrodes are extended to portions of upper and lower surfaces of the ceramic body.

7. The array-type multilayered ceramic electronic component of claim 1, wherein the internal electrode multilayered part is formed by disposing the internal electrodes to have a ceramic layer interposed therebetween and to be overlapped with each other.

8. The array-type multilayered ceramic electronic component of claim 1, wherein the plurality of internal electrode multilayered parts are connected to the plurality of external electrodes opposing each other, respectively.

9. The array-type multilayered ceramic electronic component of claim 1, wherein each of adjacent internal electrodes in the internal electrode multilayered part is exposed in opposing directions to thereby be connected to the external electrodes opposing each other.

10. The array-type multilayered ceramic electronic component of claim 1, wherein the gap G between the internal electrode multilayered parts is an average gap between positions of end portions of the plurality of multilayered internal electrodes.

11. The array-type multilayered ceramic electronic component of claim 1, wherein when the number of internal electrode multilayered parts is three or more, the gap G between the internal electrode multilayered parts is a minimum value among a plurality of gaps in any one layer.

12. The array-type multilayered ceramic electronic component of claim 1, wherein the internal electrode includes a capacitance part contributing to capacitance formation and an exposed part connecting the capacitance part to the external electrode, the capacitance part and the exposed part having a rectangular shape.

13. The array-type multilayered ceramic electronic component of claim 1, wherein the ceramic body is a 0906-sized or smaller.

14. The array-type multilayered ceramic electronic component of claim 1, wherein when a gap from a surface of the ceramic body to the internal electrode multilayered part is M, $G \leq M$.

15. The array-type multilayered ceramic electronic component of claim 14, wherein $M \leq 200 \mu m$.

16. An array-type multilayered ceramic electronic component comprising:
    a ceramic body;
    a plurality of first and second external electrodes formed on one surface of the ceramic body and the other surface thereof opposing the one surface;
    a plurality of first internal electrodes connected to the plurality of first external electrodes formed on the one surface of the ceramic body, respectively, and planarly formed on a common layer; and
    a plurality of second internal electrodes each disposed to have a ceramic layer interposed between the plurality of first internal electrodes and the plurality of second internal electrodes to thereby be planarly formed on a common layer, connected to the plurality of second external electrodes formed on the other surface, and overlapped with the plurality of first internal electrodes, respectively,
    when a gap between the plurality of internal electrodes on the common layer is G, a density of the internal electrode is D, and a gap from a surface of the ceramic body to the first and second internal electrodes is M, the conditions of $40\% \leq D \leq 57\%$, $10\mu m \leq G \leq M$, and $G \leq (0.0577 \times D^2) - (4.4668 \times D) + 111.22$ being met.

17. The array-type multilayered ceramic electronic component of claim 16, wherein $M \leq 200 \mu m$.

18. The array-type multilayered ceramic electronic component of claim 16, wherein each of the first and second internal electrodes includes a capacitance part and an exposed part, the exposed part being smaller than the capacitance part.

19. The array-type multilayered ceramic electronic component of claim 16, wherein the capacitance part has a rectangular shape.

20. The array-type multilayered ceramic electronic component of claim 16, wherein the gap between the plurality of internal electrodes on the common layer is a gap between the capacitance parts.

21. The array-type multilayered ceramic electronic component of claim 16, wherein the number of each of the first and second internal electrodes is two.

22. The array-type multilayered ceramic electronic component of claim 16, wherein the external electrode covers exposed parts of the first and second internal electrodes.

23. The array-type multilayered ceramic electronic component of claim 16, wherein the external electrode is extended in a direction in which the first and second internal electrodes are multilayered.

24. The array-type multilayered ceramic electronic component of claim 16, wherein the external electrode is extended to portions of upper and lower surfaces of the ceramic body.

25. The array-type multilayered ceramic electronic component of claim 16, wherein the ceramic body is a 0906-sized or smaller.

* * * * *